United States Patent [19]

McGinniss

[11] 4,094,843

[45] June 13, 1978

[54] AQUEOUS COATING COMPOSITION AND PROCESS FROM A MERCAPTAN CONTAINING POLYMER AND A BIS-MALEIMIDE

[75] Inventor: Vincent Daniel McGinniss, Valley City, Ohio

[73] Assignee: SCM Corporation, New York, N.Y.

[21] Appl. No.: 781,549

[22] Filed: Mar. 28, 1977

Related U.S. Application Data

[63] Continuation-in-part of Ser. No. 708,106, Jul. 23, 1976, Pat. No. 4,035,272, which is a continuation-in-part of Ser. No. 594,448, Jul. 14, 1975, abandoned, which is a continuation-in-part of Ser. No. 519,409, Oct. 31, 1974, Pat. No. 3,925,181.

[51] Int. Cl.² .............................................. C08J 3/00
[52] U.S. Cl. ...................... 260/29.2 N; 204/159.15; 204/159.16; 204/159.19; 204/181 R; 260/29.2 TN; 260/29.2 EP; 260/29.2 E; 260/29.6 NR; 260/29.6 RW; 260/836; 260/837 R; 260/857 G; 260/859 R; 260/873; 260/885; 427/54; 428/418; 428/423; 428/458; 428/461

[58] Field of Search ................ 204/181; 260/29.2 N, 260/29.2 E, 29.2 EP, 29.2 TN, 29.6 N, 29.6 RW

[56] References Cited

U.S. PATENT DOCUMENTS

| 3,738,967 | 6/1973 | Crivello | 260/73 UA |
|---|---|---|---|
| 3,741,942 | 6/1973 | Crivello | 260/73 UA |
| 4,025,409 | 5/1977 | McGinniss | 204/181 |
| 4,029,561 | 6/1977 | McGinniss | 204/181 |
| 4,035,272 | 7/1977 | McGinniss | 204/181 |
| 4,035,273 | 7/1977 | McGinniss | 204/181 |

*Primary Examiner*—Richard B. Turer
*Attorney, Agent, or Firm*—Jerry K. Mueller, Jr.

[57] ABSTRACT

A curable coating composition contains a polymer having pendant mercaptan groups and a bis-maleimide cross-linking agent. The mercaptan groups of the polymer cross-link with the bis-maleimide upon curing to form a fully cured coating. In a preferred embodiment, the coating composition serves as a cathodic electrocoating composition.

12 Claims, No Drawings

AQUEOUS COATING COMPOSITION AND PROCESS FROM A MERCAPTAN CONTAINING POLYMER AND A BIS-MALEIMIDE

CROSS-REFERENCE TO RELATED APPLICATIONS

This application is a continuation-in-part of copending application U.S. Ser. No. 708,106 of Jul. 23, 1976, now U.S. Pat. No. 4,035,272 which is a continuation-in-part of application U.S. Ser. No. 595,448 of Jul. 14, 1975 (now abandoned), which is a continuation-in-part of application U.S. Ser. No. 519,409 of Oct. 31, 1974, now U.S. Pat. No. 3,925,181.

BACKGROUND OF THE INVENTION

This invention relates to water-disposed polymers in aqueous coatings and more particularly to cross-linking mercaptan groups on the polymers with bis-maleimide.

The aqueous coatings containing a polymer having pendant mercaptan groups and the bis-maleimide can be electrodeposited onto a cathode substrate and, thus, can be employed as a cathodic electrocoating composition as described in copending application Ser. No. 708,106. The aqueous coatings also can be applied to a substrate by conventional techniques such as dipping, rolling, spraying, and like techniques. The applied film of the aqueous coating composition is curable by heat, ultraviolet radiation, and ionizing radiation (electron beam) wherein the bis-maleimide cross-links the polymer, and such curing is independent of the particular method of application of the coating composition.

SUMMARY OF THE INVENTION

A curable coating composition in aqueous dispersion for forming a curable film on a substrate, comprising: a water-dispersed polymer having at least about 5% pendant mercaptan groups and at least about 5% by weight of said polymer of bis-maleimide cross-linking agent. The coating can be conventionally applied or it can be applied by cathodic electrodeposition techniques. Curing can be by heating of the coated substrate, exposure of the coating to an electron beam, or by ultraviolet irradiation of the coating in the presence of an ultraviolet sensitizer or photosensitizer.

DETAILED DESCRIPTION OF THE INVENTION

The coating composition contains a polymer or resin selected according to final desired use from a wide variety of known polymers in the coatings and electrocoating art.

The polymers contain pendant mercaptan groups. Mercaptan groups can be attached to the polymer by esterification of free hydroxyl groups on the polymer (for example, a polyester) with a mercaptan-terminated acid, such as mercaptopropionic acid. Similarly, mercaptan groups can be introduced into the polymer by reacting pendant primary or secondary amine groups on a polymer with a mercaptan-terminated acid or by reacting the free isocyanate group on a mono-isocyanate terminated polymer with a mercaptan-terminated acid ester having at least two pendant mercaptan groups. Mercaptan groups can be introduced into the polymer by numerous other methods which are well known in the art and as further exemplified in the Examples of this application. The mercaptan groups are pendantly attached to the polymer. For purposes of this application pendant mercaptan groups include terminal mercaptan groups. By pendantly attached is meant that such mercaptan groups are attached to the polymer chain or to a pendant side chain of the polymer. The polymer containing pendant mercaptan groups should contain at least about 5% by weight of such pendant mercaptan groups, and up to about 50% if desired.

Representative polymers containing pendant mercaptan groups can be derived from epoxy and epoxy-modified diglycidyl ethers of bisphenol A structures, various aliphatic polyethylene or polypropylene glycol (diglycidyl ether) adducts, and glycidyl ethers of phenolic resin. Other useful polymers containing pendant mercaptan groups include polyamide resins, for example, condensation products of dimerized fatty acids co-reacted with difunctional amine, such as ethylene diamine, followed by reaction with 3-mercaptopropionic acid. Polyamide resins generally are between about 500 and about 5,000 molecular weight. Further useful electrocoating polymers containing mercaptan groups include acrylic resins having molecular weight of about 1,000 to about 100,000, polyester resins and polyurethane resins both having a molecular weight range of about 500 to about 5,000, vinyl resins, and amine resins. Various other useful polymers containing pendant mercaptan groups can be advantageously employed in the coating composition of this application as will be apparent to those skilled in the art.

The cross-linking agent is a bis-maleimide having alpha-, beta-ethylenic unsaturation capable of being reactive to cross-link the mercaptan groups on the polymer.

Bis-maleimides can be represented by the following general structure:

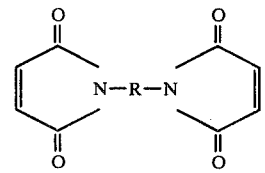

where R is aliphatic, aromatic, aliphatic-aromatic, and suitably alkylene, arylene, alkylene-arylene, or polymers having a molecular weight up to about 3,000.

Alkylene-, arylene-bis-maleimides and combinations thereof are particularly useful as the cross-linking agent of this invention. Specific bismaleimides which are particularly suited to the precepts of this invention can be selected from the group consisting of dimethylenedimaleimide, trimethylenedimaleimide, tetramethylenedimaleimide, pentamethylenedimaleimide, hexamethylenedimaleimide, heptamethylenedimaleimide, decamethylenedimaleimide; the bis-maleimides of 4,4'-methylene-bis (orthochloroaniline), 4,4'-methylenedianiline, 4,4'-methylene-bis (3-nitroaniline), 4-aminophenylether; and N,N'-orthophenylenedimaleimide, N,N'-para-phenylenedimaleimide, and N,N-metaphenylenedimaleimide.

Bis-maleimides can be synthesized by various methods such as are disclosed in U.S. Pat. No. 2,444,536 and the same is incorporated expressly herein by reference. Generally, a diluted ether solution of diamine is added to a similar diluted ether solution of maleic anhydride which results in a maleamic acid. The maleamic acid can be disposed in acetic anhydride and converted into the corresponding bismaleimide in the presence of potassium acetate.

In practicing this invention, the polymer is rendered water dispersible by conventional techniques such as by adding acid and halogen or alkyl halide, such as, for example, methyl iodide, to the polymer to form a sulfonium ion wherein the sulfonium ion, for example, can be formed from a minor portion of the mercaptan groups or alternatively from available thioethers in the polymer backbone. The polymer also can contain pendant amine groups (typically in minor proportion of less than 5% by weight of the polymer) which solubilize the polymer in the aqueous bath when protonated with a proton-donating acid. The particular method of solubilizing or water dispersing the electrocoating polymer is not critical to the invention and is accomplished by general techniques well known in the art. Solubilization or water dispersing of the polymer can migrate to the cathode substrate and be deposited thereon during electrodeposition applications of the coating composition. While the polymer is dispersed in the bath, the mercaptan groups will not react with the unsaturated cross-linking agent as the polymer is stable in water.

The neutralized polymer is blended with at least about 5% bis-maleimide cross-linking agent by weight of the polymer and up to about 50% if desired. The blend then is dispersed in water at from about 5% to about 50% or greater nonvolatile solids dispersion with about 5% to about 20% being preferred for an electrocoating bath of the composition. The aqueous coating composition is generally at about 50% to about 125° F., with about 70° to about 95° F. being preferred for an electrocoating bath of the composition.

The aqueous coating composition can be applied by conventional techniques such as, for example, brushing, rolling, spraying, dipping, and the like. The applied film of the coating composition then is heated at a temperature sufficient to cure the film of the composition. While mere room temperature cure can be practiced, preferably the coated substrate is subjected to moderate heating of from about 100° F. to about 400° F. for about 5 to about 40 minutes.

When the present composition is to be used as a cathodic electrocoating composition, the cathode substrate to be electrocoated is immersed in the electrocoating bath while an electric potential is maintained therethrough as disclosed in U.S. Pat. No. 3,619,398, the same being incorporated herein by reference. During electrodeposition the positively charged polymer along with the bis-maleimide migrate to the cathode substrate. The polymer and bis-maleimide are codeposited on the cathode substrate. The electric potential applied to the bath is generally between about 20 and about 500 volts, with about 50 to about 300 volts being preferred. The coated substrate is removed from the bath, washed with water to remove excess coating, and then can be conventionally heat-cured at a temperature of at least about 100° F. and preferably between about 200° and 400° F. for about 5 to about 40 minutes. The polymer crosslinks through pendant mercaptan groups attached to the electrocoated polymer.

With convention application and with electrodeposition of the composition, the alpha-, beta-ethylenic unsaturation of the bis-maleimide is heat reactive under the conditions of curing and readily reacts with the pendant mercaptan groups of the polymer in an addition polymerization reaction. Upon such heating a fully cured coating coats the substrate.

The coating also can be cured by exposure thereof to ionizing radiation (electron beam curing) as disclosed in U.S. Pat. Nos. 3,501,390 and 3,501,391, the same being incorporated expressly herein by reference.

The coating additionally can be cured with ultraviolet radiation in the presence of an ultraviolet (UV) sensitizer or photosensitizer. In cathodic electrocoating uses, the UV sensitizers are combined with the electrocoating composition and are adapted to be simultaneously codeposited with the composition onto the cathode substrate during the electrodeposition process. The UV sensitizers are added to the coating composition in amounts of at least about 0.5% and preferably between about 1% and 5% by weight of the polymer.

Useful UV sensitizers or photosensitizers include halogenated polynuclear ketones as disclosed in co-pending Ser. No. 480,738 (filed June 19, 1974), now U.S. Pat. 4,039,414 and U.S. Pat. No. 3,827,957, the same incorporated expressly herein by reference. Other suitable UV sensitizers include organic carbonyl compounds selected from alkylphenones, benzophenones, and tricyclic fused ring compounds as disclosed in U.S. Pat. No. 3,759,807 and incorporated expressly herein by reference. Further useful UV sensitizers include carbonylated phenyl nuclear sulfonyl chlorides such as set forth in U.S. Pat. No. 3,827,959, and expressly incorporated herein by reference. Additional useful photosensitizer combinations particularly suitable for pigmented coatings are a combination of sensitizers comprising aromatic carbonyl compounds, aromatic aldehyde or aromatic ketones, and a synergistic sensitizer of about 0.05% to 3% of 2,2'-dithiobis-(benzothiazole) as more particularly set forth in U.S. Pat. No. 3,847,771, and expressly incorporated herein by reference.

At least about 0.5% by weight of ultraviolet sensitizer and preferably about 1% to 5% sensitizer is added to the polymer and thoroughly mixed or otherwise dispersed in the polymer phase prior to solubilizing the polymer in an aqueous solution. The sensitizer also can be attached to the backbone of the polymer, especially in cathodic electrocoating uses such as shown in application U.S. Ser. No. 480,738 of June 19, 1974, now U.S. Pat. No. 4,039,414 the disclosure of which is expressly incorporated herein by reference.

Typical sources of ultraviolet energy ordinarily produce wavelengths in the ultraviolet spectrum that are transmitted through a quartz and such wavelengths are usually about 1,600 A and 4,000 A. Suitable ultraviolet emittors include various electric arc lamps, plasma arc torch, such as described in U.S. Pat. No. 3,364,387, and lasers having a lasing output in the ultraviolet spectrum as disclosed in copending U.S. Ser. No. 189,154 (filed Oct. 14, 1971 and now abandoned) the disclosures of said references are incorporated expressly herein by reference. Other suitable sources of actinic light include quartz mercury lamps, ultraviolet quartz lamps, and high flash lamps. Details of ultraviolet radiation curing the instant electrocoating composition can be as practiced in copending U.S. Ser. No. 480,738, Now U.S. Pat. 4,039,414, the disclosure of which is incorporated expressly herein by reference.

A cathode substrate is an electrically conductive metal such as iron, steel, aluminum, copper, galvanized steel, zinc, and the like. The cathode substrate can be in the shape of bars, sheets, irregularly shaped forms with rounded or sharp edges, and like shapes. With conventional application of the coating, the substrate can be metal, wood, fiberboard, and the like. The coating composition can contain opacifying pigments and inert extenders such as, for example, titanium dioxide, zinc oxide, clays such as kaolinite clays, silica, talc, and the like.

The following examples show how the instant invention can be practiced, but should not be construed as limiting the invention. In the specification all parts are parts by weight, all percentages are weight percentages, and all temperatures are in degrees Fahrenheit, unless otherwise expressly indicated.

EXAMPLE 1

A hydroxyl-rich polyester was formulated by the reaction of two moles of succinic anhydride with three moles of propylene glycol. This resin was reacted further with an excess (based on the free hydroxyl content of the polyester resin) of 3-mercaptopropionic acid in order to attach mercaptan groups to the resin. One hundred grams of this mercaptan-terminated resin was acidified with three moles of acetic acid and methyl iodide, and blended with 30 grams of N,N'-paraphenylenedimaleimide cross-linking agent. The blend was dispersed in water to form an 8% non-volatile dispersion (electrocoating bath).

A steel panel was immersed in the bath as the cathode and the electrocoating composition was electrodeposited therein at 60 volts for two minutes. The coated panel was removed from the bath, washed with water, and baked at 360° F. for 15 minutes. A solvent-resistent coating with no mercaptan odor covered the panel indicating that curing had taken place.

EXAMPLE 2

An amine-terminated polyamide resin was formulated by the reaction of two moles of 1,6-hexylamine with one mole of adipic acid. This resin was reacted with two moles of 3-mercaptopropionic acid to produce a mercaptan-terminated polyamide resin. One hundred grams of the mercaptan-terminated polyamide resin was acidified with an excess of lactic acid and methyl iodide, blended with 20 grams of 1,6-hexamethylene-bis-maleimide cross-linking agent, and added to water to form a 10% non-volatile dispersion.

The electrocoating composition in the electrocoating bath was cathodically electrodeposited onto a steel panel at 100 volts for one minute. The coated panel was removed from the bath, washed with water, and baked at 250° F. for 40 minutes. A fully cured coating having no mercaptan odor covered the panel.

EXAMPLE 3

Two moles of toluenediisocyanate was reacted with one mole of poly(tetramethylene ether glycol), having a molecular weight of 2,000, followed by a further reaction with one mole of propanol to produce a monoisocyante-terminated urethane resin. This resin was reacted with one mole of the triester of 3-mercaptopropionic acid with trimethylolpropane to produce a difunctional mercaptan-terminated urethane polymer. One hundred grams of said mercaptanterminated urethane polymer was neutralized with acetic acid and methyl iodide, blended with 20 grams of N,N-orthophenylene-dimaleimide cross-linking agent. The blend then was added to water to form an 8% non-volatile dispersion.

The electrocoating composition in the electrocoating bath was cathodically electrodeposited onto steel panels in a manner similar to the previous Examples, washed with water, and baked at 400° F. for 25 minutes. A fully cured coating covered the panels.

EXAMPLE 4

One mole of 1,6-hexanediamine was reacted with one mole of adipic acid to form an amine-terminated polyamide resin. This resin then was reacted with one mole of 3-mercaptopropionic acid to form a polyamide resin having pendant mercaptan and amine groups. Pendant amine groups on the mercaptan-functional polymers aid in dispersing the polymers in the aqueous electrocoating bath.

The electrocoating polymer was a blend of 50% by weight each of the above polyamide resin and the urethane polymer of Example 3. A polymer-bis-maleimide cross-linking agent was formulated by reacting two moles of succinic anhydride with one mole of polyoxyethylene glycol (molecular weight of 1540), which reaction product was reacted further with two moles of hexamethylene diamine. This polymer-diamine was dissolved in tetrahydrofuran (10% solution by weight) and then added to a solution of two moles of maleic anhydride (10% solution by weight in tetrahydrofuran) to form a polyether-bis-maleimide compound in the presence of acetic anhydride and potassium acetate.

The electrocoating polymer was neutralized with acetic acid and blended with the polyether-bis-maleimide cross-linking agent in water to form a 20% non-volatile dispersion. This blend was cathodically electrodeposited onto a steel panel at 100 volts for 2 minutes, washed with water, and baked at 400° F. for 35 minutes. A hard, flexible, solvent-resistant coating covered the panel.

EXAMPLE 5

One mole of an epoxy resin (DER 664, epoxy equivalent weight of 900, DOW Epoxy Resin, Dow Chemical Company) was reacted with one mole of methyl ethanol amine followed by a further reaction with trimethylolpropane tri-(beta-mercaptopropionate) to produce a mercaptan-functional epoxy resin. This resin was neutralized with lactic acid and methyl iodide, blended with 20% of N,N'-paraphenylenedimaleimide, and the blend added to water to form an 8% non-volatile dispersion.

The electrocoating composition was cathodically electrodeposited onto a steel panel in a manner similar to the previous Examples, removed from the bath, and washed with water. The coated panel then was heated at a sufficiently low temperature (about 150° F.) to effect only a flow-out of the coating on the panel and not a curing of the coating.

The "flowed-out" panel then was subjected to electron beam irradiation from an electrocurtain (laboratory model, Energy Sciences, Inc.) under the following conditions: the terminal voltage was 150 kilovolts, the current was 10 milliamperes, the dose was 10 megarad, and the linespeed of the panel was 10 feet per minute. Upon said electron beam irradiation, a fully cured coating covered the panel.

EXAMPLE 6

To the electrocoating bath of Example 5, ten grams of benzophenone (ultraviolet sensitizer) was added. A steel panel was cathodically electrocoated and and the coating "flowed-out" in the manner of Example 5.

The "flowed-out" panel was exposed for 10 seconds to ultraviolet radiation at a distance of three inches from a 3-bulb Ashdee ultraviolet curing unit, each bulb producing 200 watts per inch on its surface. Upon said ultraviolet irradiation, a fully cured coating covered the panel.

EXAMPLE 7

Two moles of toluene diisocyanate were reacted with one mole of poly(tetramethylene ether glycol), having a molecular weight of 2,000, followed by a further reaction with one mole of dimethyl ethanol amine to produce a urethane resin having mono-isocyanate terminal functionality. This resin was reacted with one mole of trimethylolpropane tri-(beta-mercaptopropionate) in order to pendantly attach a mercaptan group to the resin.

This resin can be blended with any of the bis-maleimide cross-linking agents of this application, cathodically electrodeposited onto a metal substrate, and cured to form a fully cured coating on the substrate.

EXAMPLE 8

An acrylic copolymer was synthesized by the solution polymerization of one mole of butyl acrylate and one mole of methylmethacrylate. This reaction was run under standard solution polymerization conditions using 2-butoxy ethanol-1 as the solvent and one mole of thiolacetic acid as a chain transfer agent. This resin was hydrolyzed (with an appropriate acid or base) in order to convert the thiolacetic ester linkages into pendant, functional mercaptan groups.

This resin additionally can be blended with a bis-maleimide cross-linking agent for cathodic electrodeposition onto a metal substrate with subsequent curing of the coating in a manner similar to the above Examples.

EXAMPLE 9

Forty grams of the tri-beta-mercaptopropionic acid ester of trimethylolpropane was dispersed in 100 grams of water and 10 grams of acetone by the addition of 10 grams of methyl iodide. The aqueous coating composition was formed by blending 27 grams of N,N'-paraphenylenedimaleimide to the water-dispersed mercaptan-resin.

The coating composition was coated onto a steel panel and air-dried at room temperature for 24 hours. The coated panel then was baked at 200° F. for 5 hours to give a friable film having no mercaptan odor.

EXAMPLE 10

To the coating composition of Example 9 was added a UV photosensitizer which was a mixture of five grams of benzophenone and one gram of 2-chlorothioxanthone. A steel panel was coated with the composition and air-dried at room temperature for 24 hours. The coated panel then was irradiated with an 800-watt ultraviolet lamp for one hour to give a fully cured film having no mercaptan odor.

EXAMPLE 11

One mole of an epoxy resin (DER 332, epoxy equivalent weight 172-196 DOW Epoxy Resin, Dow Chemical Company) was reacted with one mole of dodecylmercaptan, which was further reacted with 0.5 moles of the tri-beta-mercaptopropionic acid ester of trimethylolpropane. To 20 grams of this resin was added five grams of methyliodide, 50 grams of water, and 15 grams of N,N'-paraphenylenedimaleimide cross-linking agent.

A steel panel was coated with the coating composition and baked at 300° F. for 1 hour to give a fully cured film having no mercaptan odor.

I claim:

1. A coating composition in aqueous dispersion for forming a curable film thereof, comprising:
   a water-dispersed polymer having at least about 5% by weight pendant mercaptan groups; and
   at least about 5% by weight of said polymer of bis-maleimide cross-linking agent;
said bis-maleimide having alpha-, beta-ethylenic unsaturation for cross-linking said polymer through said mercaptan groups by addition polymerization upon subsequent curing of said curable film.

2. The coating composition of claim 1 wherein said bis-maleimide is represented by the general structure:

$$\underset{O}{\overset{O}{\underset{\|}{\bigcirc}}}N-R-N\underset{O}{\overset{O}{\underset{\|}{\bigcirc}}}$$

where R is alkylene, arylene, alkylene-arylene, or a polymer having a molecular weight up to about 3,000.

3. The coating composition of claim 1 wherein said polymer is rendered water-dispersible by adding acid and alkyl halide or halogen to said polymer to form sulfonium ion groups from a minor portion of said mercaptan groups.

4. The coating composition of claim 1 wherein said polymer also has a minor portion of pendant amine groups which are protonated with proton-donating acid for dispersing said polymer in said bath.

5. The coating composition of claim 1 wherein said curable film is heat curable.

6. The coating composition of claim 1 wherein said curable film is ionizing radiation curable.

7. An electrocoating composition dispersed in an aqueous electrocoating bath for electrodeposition onto a cathode substrate disposed within said bath for forming a curable electrodeposited coating on said cathode substrate, comprising:
   a water-dispersed electrocoating polymer having at least about 5% by weight pendant mercaptan groups; and
   at least about 5% bis-maleimide cross-linking agent by weight of said polymer,
said bis-maleimide having alpha-, beta-ethylenic unsaturation for cross-linking said polymer by addition polymerization with said mercaptan groups upon subsequent curing of said electrodeposited coating.

8. The coating composition of claim 1 wherein said polymer is a polyester polymer.

9. The coating composition of claim 1 wherein said polymer is a polyamide polymer.

10. The coating composition of claim 1 wherein said polymer is a urethane polymer.

11. The coating composition of claim 1 wherein said polymer is an epoxy polymer.

12. The coating composition of claim 1 wherein said polymer is an acrylic copolymer.

* * * * *